Aug. 2, 1966  H. J. SHAFER  3,263,312
METHOD OF FABRICATING BALL VALVES
Original Filed May 2, 1962  4 Sheets-Sheet 1

INVENTOR.
HOMER J. SHAFER
BY Hamilton & Cook
ATTORNEYS

Aug. 2, 1966    H. J. SHAFER    3,263,312
METHOD OF FABRICATING BALL VALVES
Original Filed May 2, 1962    4 Sheets-Sheet 2

INVENTOR.
HOMER J. SHAFER
BY Hamilton & Cook
ATTORNEYS

Aug. 2, 1966      H. J. SHAFER      3,263,312

METHOD OF FABRICATING BALL VALVES

Original Filed May 2, 1962      4 Sheets-Sheet 3

INVENTOR.
HOMER J. SHAFER
BY Hamilton & Cook
ATTORNEYS

Aug. 2, 1966          H. J. SHAFER          3,263,312
METHOD OF FABRICATING BALL VALVES
Original Filed May 2, 1962          4 Sheets-Sheet 4
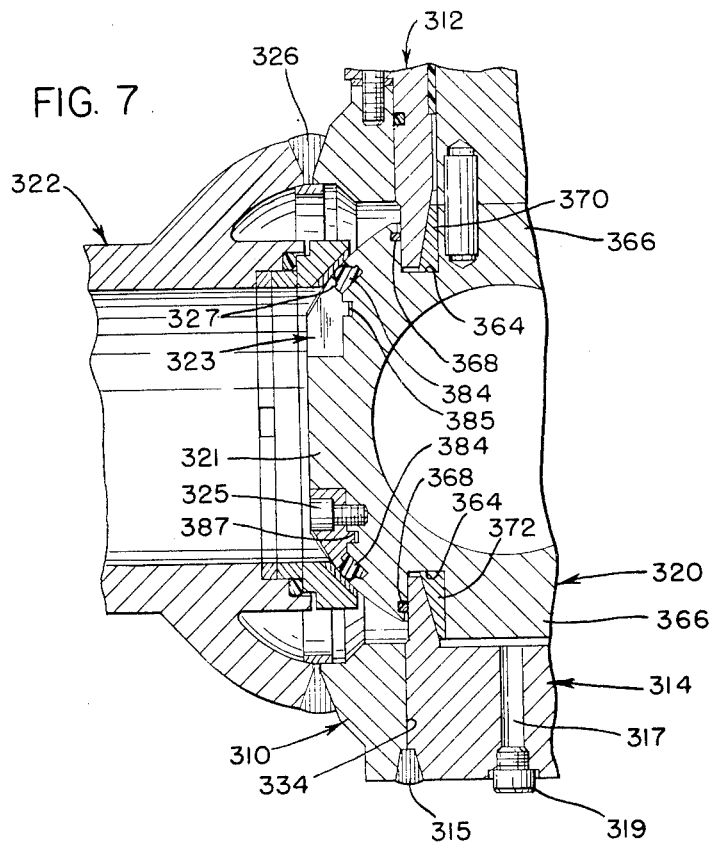
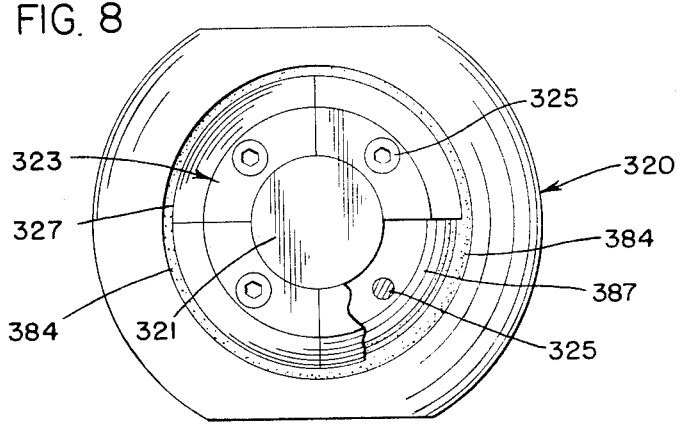
INVENTOR.
HOMER J. SHAFER
BY *Hamilton & Cook*
ATTORNEYS 3,263,312
METHOD OF FABRICATING BALL VALVES
Homer J. Shafer, Brookwood Way, Mansfield, Ohio
Original application May 2, 1962, Ser. No. 191,831, now Patent No. 3,195,857, dated July 20, 1965. Divided and this application Mar. 8, 1965, Ser. No. 446,452
11 Claims. (Cl. 29—157.1)

This is a division of application Serial No. 191,831, filed May 2, 1962, now U.S. Patent No. 3,195,857.

The invention relates to ball valves, and particularly to an improved method of assembly of a fixed axis or trunnion mounted ball shut-off valve.

In certain ball valve constructions the body of the valve housing consists of several parts bolted together. If the pipeline in which the completed ball valve unit is installed should become distorted, or if the valve body has been bolted unevenly, the ball is apt to bind in its seat, making it difficult if not impossible to operate. Moreover, the bolts corrode and ultimately fail to hold the housing parts rigidly in position around the ball. In order to eliminate these difficulties and substantially reduce expense, a ball valve construction was designed whereby the ball was installed within a central tubular section of the valve housing and then the flow tubes were joined to the central section by welding. This construction may be seen in my Patent No. 2,890,017, issued June 9, 1959.

In welded ball valve constructions seals may be installed prior to or after welding. If installed prior to welding, it is necessary to circulate a cooling medium through the valve body around the ball during welding to prevent damage to the seals from the heat of the welding operation, as disclosed in my Patent No. 2,890,017. If installed after welding, special sealing construction must be provided for inserting the seals through the flow tubes and accurately positioning them against the ball.

Certain prior constructions have disclosed a welded trunnion-mounted ball valve construction wherein the seals are installed after the welding through the port openings of the flow tubes. In the present invention I provide an improved insertable sealing construction for maintaining a predetermined working tolerance between the trunnion-mounted ball and the ball seating surfaces.

Accordingly, an object of the present invention is to provide a method of fabricating a welded trunnion-mounted ball valve construction having a working tolerance between the ball and all the ball seating surfaces.

A further object is to provide an improved method of fabricating a welded ball valve wherein a predetermined clearance is maintained between the ball and it seats during welding together of the housing parts with the ball in place.

These and other objects are accomplished by the novel ball shut-off valve construction of the present invention, preferred embodiments of which are shown by way of example in the accompanying drawings and described in detail in the following specification as representing the best mode of achieving the purposes of the invention. Various changes and modifications are contemplated within the scope of the appended claims.

Referring to the drawings:

FIG. 7 is a fragmentary longitudinal sectional view of still another form of ball shut-off valve in closed position, showing the bottom trunnion welded to the center tube and a modified form of ring seal retainer plate.

FIG. 8 is a fragmentary transverse elevational view of the quarter sectioned ring seal retainer plate of FIG. 7, with parts broken away.

Figure 1:
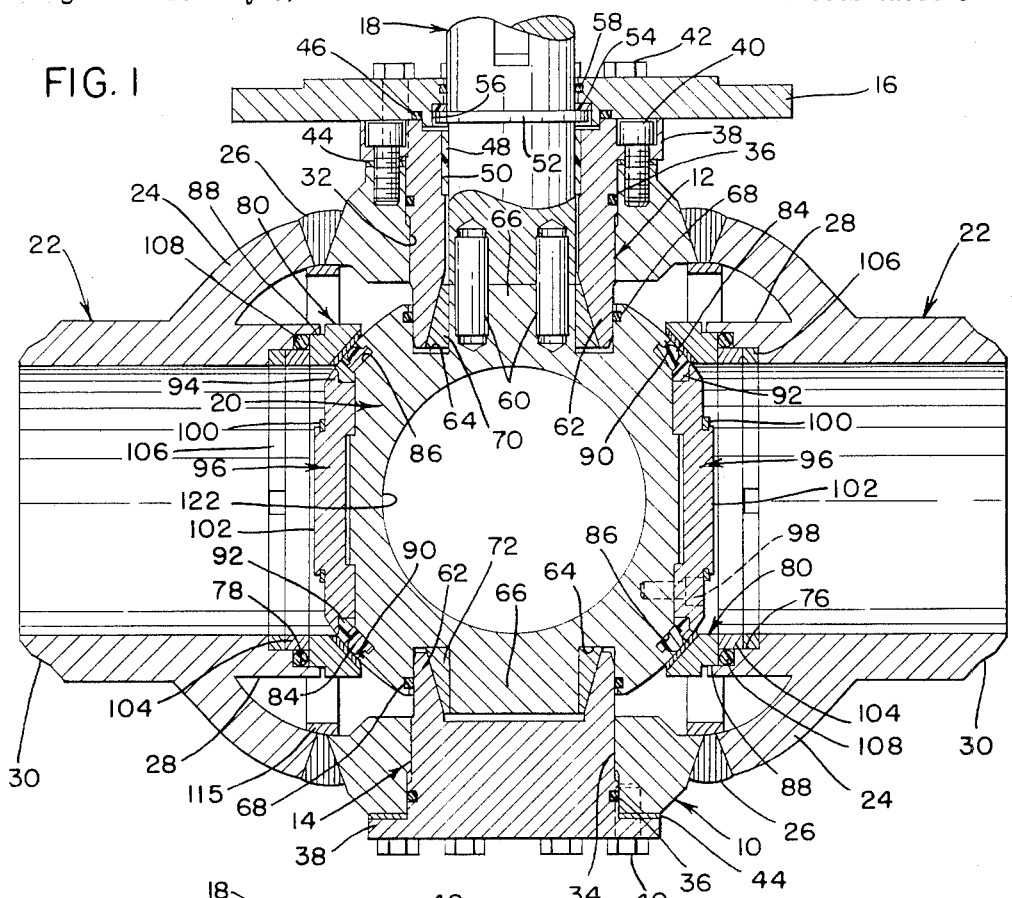
FIG. 1 is a longitudinal sectional view of a trunnion-mounted ball shut-off valve and embodying one form of ring seal construction and separate ball seating surfaces, the ball being shown in fully closed position.
Figure 2:
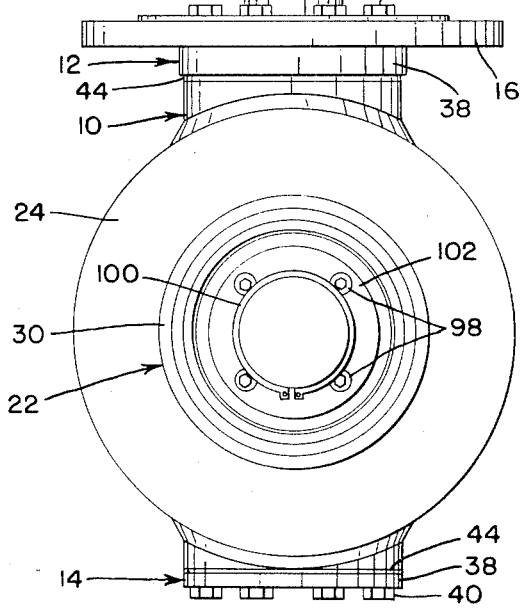
FIG. 2 is an end elevation of the ball shut-off valve of FIG. 1 in fully closed position.
Figure 1A:
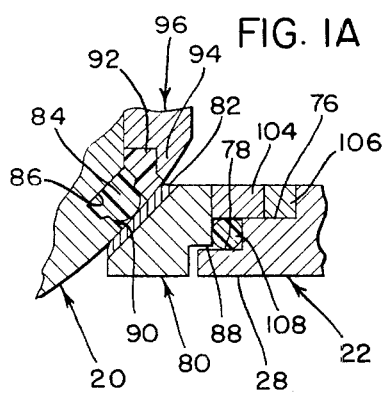
FIG. 1A is an enlarged fragmentary view of FIG. 1.

Referring to FIGS. 1–5, the valve body preferably comprises a central tube 10 having transversely aligned top and bottom trunnions 12 and 14 therein, with an exterior annular mounting flange 16 carried on trunnion 12 for supporting a hydraulic motor (not shown) which rotates the valve stem 18 of the ball shut-off 20. The stem is journaled in the top tubular trunnion 12.

Flow tubes 22, having their axes coincident with the axis of central tube 10 are telescoped within the ends of tube 10 and have integral radially outwardly curved portions 24, the outer ends of which are welded to the ends of tube 10 at 26. The tubes 22 have inner cylindrical ends 28 within the ends of tube 10 and preferably are beveled at their outer ends 30 for welding connection to the pipes in the line in which the valve is connected.

The trunnions 12 and 14, as shown in FIG. 1, extend through aligned openings 32 and 34, respectively, in the central tube 10 and are provided with annular grooves for O-rings 36, the latter providing a seal between the trunnions and the openings in the tube 10. The top and bottom trunnions are further provided with annular flanges 38 which are preferably secured to the central tube 10 by bolts 40 and the exterior annular mounting flange 16 is secured to the top trunnion 12 by bolts 42. Shims 44 are interposed between the flanges of the trunnions and the central tube 10, and an O-ring 46 is disposed in an annular groove in the flange 16 to provide a seal between the flange and the top trunnion 12.

The valve stem 18 is journaled in the top trunnion 12 and a Teflon sleeve bushing 48 is provided therefor to fit within a counterbore 50 in the trunnion. An annular flange 52 on stem 18 abuts a Teflon stem thrust washer 54 on the underside of mounting flange 16, and both fit within a counterbore 56 provided in the mounting flange 16. O-ring 58 provides a further seal between the stem and flange 16. Preferably, the stem is keyed to the ball shut-off 20 by pins 60 so that there can be no relative movement between the ball and the stem.

The annular inner ends 62 of the top and bottom trunnions are preferably tapered or beveled, and fit within annular recesses 64 provided in the ball shut-off 20 about integrally formed stub shafts 66, the latter extending slightly above the spherical surface of the ball. Annular grooves are formed within the outer wall of the annular recesses for O-rings 68 which provide seals between the inner ends of the trunnions and the ball shut-off so as to prevent pressure in the cavity around the ball from getting within the annular recesses and forcing the trunnions outwardly. Within the annular recesses 64 are beveled bearing rings 70 and 72, complementary to the beveled inner ends 62 of the top and bottom trunnions and preventing bottoming of the trunnions in the ball to permit relatively free rotative support of the ball.

Due to the construction and arrangement of the upper tubular trunnion 12 journaling the valve stem 18 therein, the line pressures on the ball in closed position are taken by the upper and lower trunnions, with the result that the valve stem turns freely at all times.

The inner ends 28 of flow tubes 22 are each provided with stepped inner and outer counterbores 76 and 78 to axially adjustably accommodate separate ball seating rings 80, the latter preferably having spherical Stellite coated seating surfaces 82 to conform to the exterior surface of the ball 20.

The Stellite coated seating surfaces of the valve seating rings 80 abut the resilient flattened ribbed or T-shaped ring seals 84 disposed partially within grooves 86 provided in the outer surface of the ball. The axially outer ends of the seating rings have reduced shoulder portions 88 interfitting the inner ends 28 of flow tubes 22 within the outer counterbores 78.

The grooves 86 provided in the outer surface of the ball have flat surfaces which are substantially parallel with a tangent to the adjacent spherical seating surfaces 82, to provide back-up seats for the corresponding flat portions of the ring seals 84. The grooves 86 are provided with annular offset shoulders 90 for locking the corresponding shoulders of the radially outer peripheries of the ring seals in place; the opposite ring seal shoulders of the radial inner peripheries being locked in place by seal retainer rings 92. The seal retainer rings 92 are preferably formed of a relatively rigid yet flexible plastic such as Delrin and are in turn locked in place against the surface of the ball shut-off by the annular offset shoulders 94 of the retainer plates 96, which are secured to the ball by bolts 98. The bolts are locked in place by snap rings 100 fitting in annular grooves in the bosses 102 of the retainer plates.

Back-up rings 104 and split retainer rings 106 are respectively provided between the shoulder portions 88 of the seating rings 80 and the inner ends of the flow tubes 22, each retainer ring designed to interfit the inner counterbore 76 and each retainer ring 104 designed to axially extend inwardly past the inner counterbore parallel to a portion of the outer counterbore 78 to hold an O-ring seal 108 in place. The ring seals 108 are radially outward of back-up rings 104 and serve as seals for the joints between the seating rings 80 and the inner ends 28 of the flow tubes 22.

The resilient flattened ribbed ring seals 84 and their grooves 86 in combination with the seal retainer rings 92, both in the ball shut-off 20, surround the inner ends of the valve seating rings 80 in the fully closed position of the ball. The ring seals are in longitudinally stretched condition and the cross section of the ring seals is such that the ring is mechanically deformed between the walls of the grooves and seal retainer rings and the Stellite coated seating surfaces to provide a tight seal between the ball and the seating rings.

*Method of fabricating*

Figure 5:
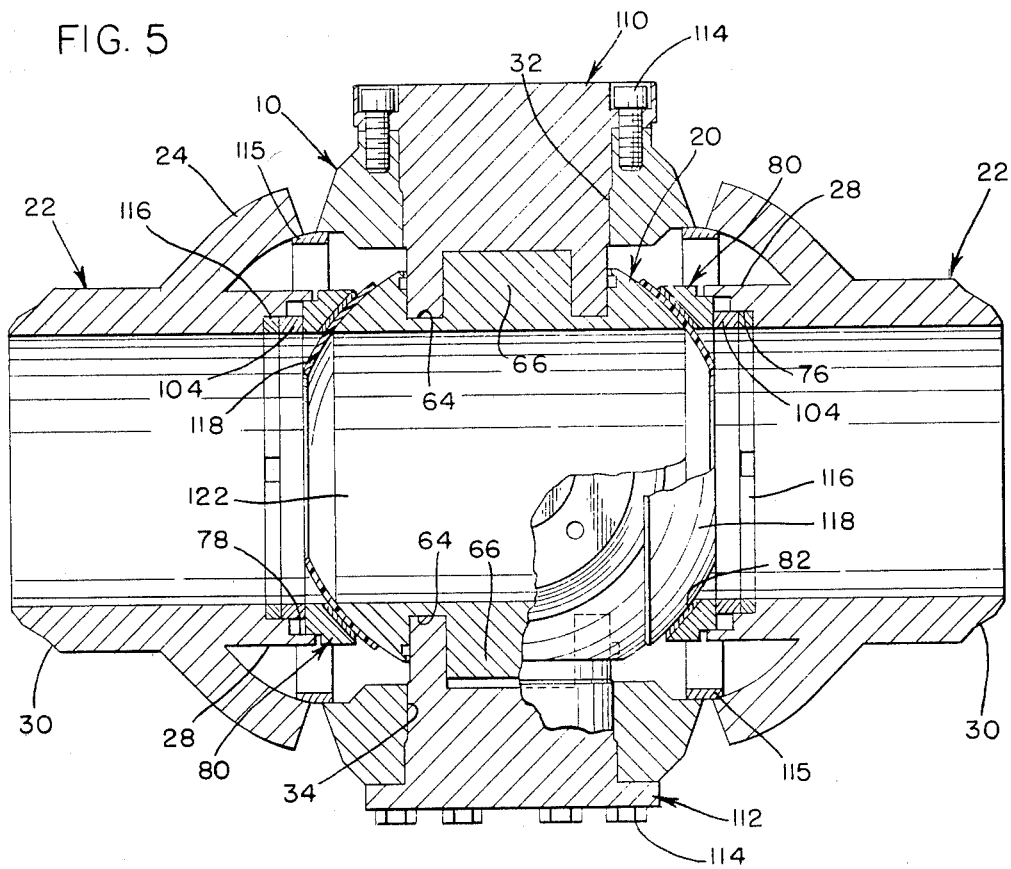
FIG. 5 is a longitudinal sectional view of a ball shut-off valve during assembly and prior to welding, showing the improved method of maintaining a predetermined clearance between the ball and ball seats during the welding operation.

In fabricating the ball valve of FIG. 1, the ball shut-off 20, without the ring seals 84, the seal retainer rings 92 and the retainer plates 96, is positioned within the central tube 10 in open position, as illustrated in FIG. 5. Dummy trunnions 110 and 112 are inserted through the openings 32 and 34 of the central tube and secured by bolts 114 whereby the ball shut-off is held in a predetermined spaced position with respect to the central tube. The flow tubes 22 are then aligned on the respective sides of the central tube and ball wih back-up welding rings 115 bridging the joints therebetween. The flow tubes are aligned so that the inner ends 28 with the interfitting valve seating rings 80, retainer rings 104 and dummy split retainer rings 116 are telescoped into the ends of the tube 10 into abutment with the ball shut-off 20. A Teflon shim 118 approximately $\frac{1}{16}''$ thick is interposed between each Stellite coated seating surface 82 and the exterior surface of the ball. The flow tubes may be held in the desired position with respect to the ball and tube 10 by clamps such as are exemplarily illustrated in the modification of FIG. 6 at 231. With the flow tubes in exact alignment with the flow port 122 of the ball, a series of tack welds are made to join portions 24 of the flow tubes 22 to the central tube 10 and then finish welds 26 of FIG. 1 are made.

The heat of the welding draws the spherical seating surfaces 82 toward the ball 20 which results in a compression of the Teflon shims 118, thereby leaving a clearance therebetween of the order of about $\frac{1}{64}$ to $\frac{1}{32}$ inch. By this particular assembly method the pressure is balanced on the ball at both spherical seating surfaces and prevents distortion of the ball and the seating surfaces.

After welding is completed, the dummy trunnions 110 and 112 are removed, the O-rings 68 and the beveled bearing rings 70 and 72 are inserted within the corresponding annular recesses 64 of the ball, followed by the regular top and bottom trunnions 12 and 14, O-rings 36, Teflon bushing 48, stem 18, and the related components shown in FIG. 1. The Teflon shims 118 are removed through the ports of the flow tubes 22 by turning the ball one way and then another. The removal of the shims leaves a slight clearance, permitting each retainer ring 104 to be moved axially toward the ball sufficiently to permit removal of the dummy split retainer rings 116. Each clearance is measured with a feeler gauge. After removal of the dummy split rings, the rings 104 are axially retracted to permit insertion of resilient ring seals 108 within the outer counterbore 76, and then are returned to abutting positions against seating rings 80 whereby regular split retainer rings 106, sized according to feeler gauge measurement to maintain desired working tolerance at the ball which is taken up by the ring seals 84, are inserted in the inner counterbore 78.

After the Teflon shims 118 have been removed, the ball is rotated to the closed position and the resilient flattened ribbed ring seals 84 are inserted through the respective port openings of the flow tubes. The installation or replacement of the ring seals in their respective grooves 86 wherein they are fully in face-to-face relation to the spherical seating surfaces in closed position and radially outwardly from the flow tube port openings is facilitated by the improved groove arrangement in cooperation with the particular configuration of the ring seals and ring seal retaining means. As described above, the flat bottomed grooves are substantially parallel with a tangent to the adjacent spherical seating surfaces 82. The radially outer peripheries of the grooves are defined by the annular offset shoulders 90, whereas the radially inner peripheries of the grooves are open. The flat bottom ring seals, where are approximately T-shape in cross section, readily slide into the grooves for secure locking abutment with the annular offset shoulders. The seal retainer rings 92, although formed from a semi-rigid type plastic such as Delrin, are nevertheless sufficiently deformable when inserted through the flow tube ports to snap into place and provide complementary locking shoulders in their radial outer peripheries for the opposite corresponding shoulders in the radially inner peripheries of the ring seals. The retainer plates 96, which have a diameter less than the diameter of the flow port openings, are freely insertable through the port openings and are provided with annular offset shoulders 94 locking the opposite corresponding shoulders of the radially inner peripheries of the retaining rings 92. The retaining plates are then bolted to the ball and the snap rings 100 prevent the bolts from becoming loose.

With the ring seals firmly locked in place, there is no danger of their being blown out of their grooves when the ring seals cross the flow tube openings during opening or closing of the ball shut-off. In the fully closed position only the ribbed portions of the ring seals project out from between the opposed locking shoulders of the ball and retainer rings, respectively, and sealingly contact the spherical seating surfaces.

Figure 6:
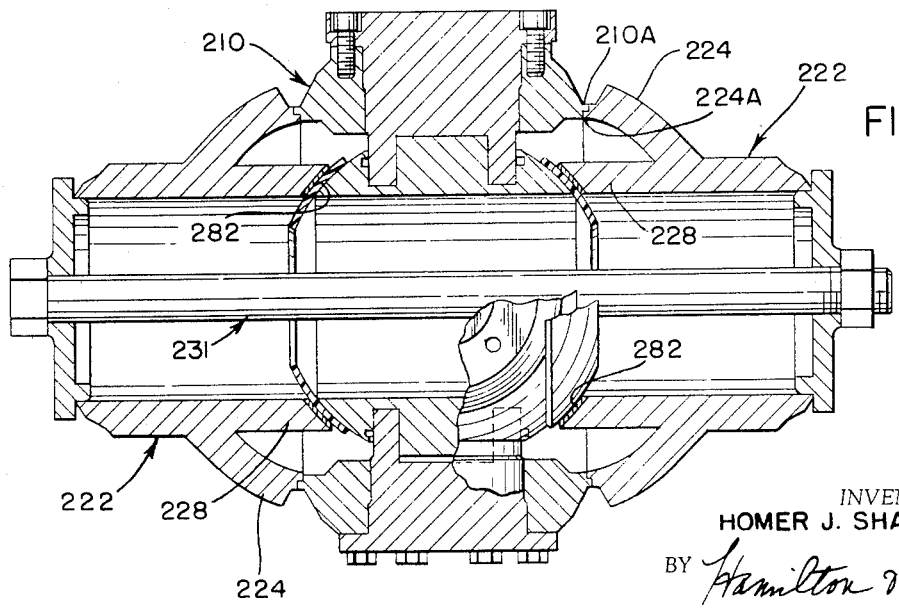
FIG. 6 is a view similar to FIG. 5 on reduced scale of another form of ball shut-off valve having integral ball seats, showing how the flow tubes are clamped to the center tube with the ball in place, in preparation for welding together.

*FIG. 6 modification*

The modification of FIG. 6 shows a similar form of a ball shut-off valve in the assembly stage except that the spherical seating surfaces 282 are formed integrally with the inner ends 228 of the flow tubes 222 and the integral curved radially outwardly portions 224 are provided, respectively, with offset flanges 224A which interconnect with offset flanges 210A of central tube 210 to aid in positioning the flow tubes.

*FIGS. 7 and 8 modification*

FIGS. 7 and 8 show a further modification in which the flow tube 322 (only one illustrated in FIG. 7) is aligned and welded to central tube 310 at 326 in the same manner as disclosed for the embodiment of FIGS. 1 and 5. However, the modification differs from the latter embodiment in certain distinctive features which will be described below.

The bottom trunnion 314, after installation through opening 334, is secured to the central tube 310 by an annular weld 315. The bottom trunnion is provided with a passage 317 and a threaded pipe plug 319 through which the bottom portion of the ball shut-off 320 may be lubricated. This passage 317 also acts as a pressure vent for the cavity during assembly. A similar passage and pipe plug may similarly be provided, although not shown, for the embodiments of FIGS. 1 and 6.

The ball shut-off 320 is similarly provided, as in the embodiments of FIGS. 1 and 6, with integrally formed stub shafts 366 and annular recesses 364, so that the top and bottom trunnions 312 and 314, and beveled bearing rings 370 and 372 may interfit wedgingly about the stub shafts. The welded bottom trunnion 314 eliminates the necessity for an O-ring, as was illustrated in the embodiment of FIG. 1 at 36. O-rings 368 similarly provide seals between the inner ends of the trunnions and the ball shut-off.

The ball shut-off 320 is further provided with annular bosses 321 (only one shown in FIG. 7) about which retainer plates 323 in quarter sections are secured to the ball by bolts 325. The quarter section plates are inserted through the ports of the flow tubes and are provided with annular offset shoulders 327 at their radially outer peripheries, which support and retain in position the corresponding offset shoulders in the radially inner peripheries of the flattened ribbed ring seals 384, and each has a rearward quarter ring axial projection 385 which fits within a groove 387 in the ball. By this particular manner of design and construction, the separate semi-rigid retainer rings 92 shown in the embodiment of FIG. 1 may be eliminated if deemed desirable.

Figure 3:
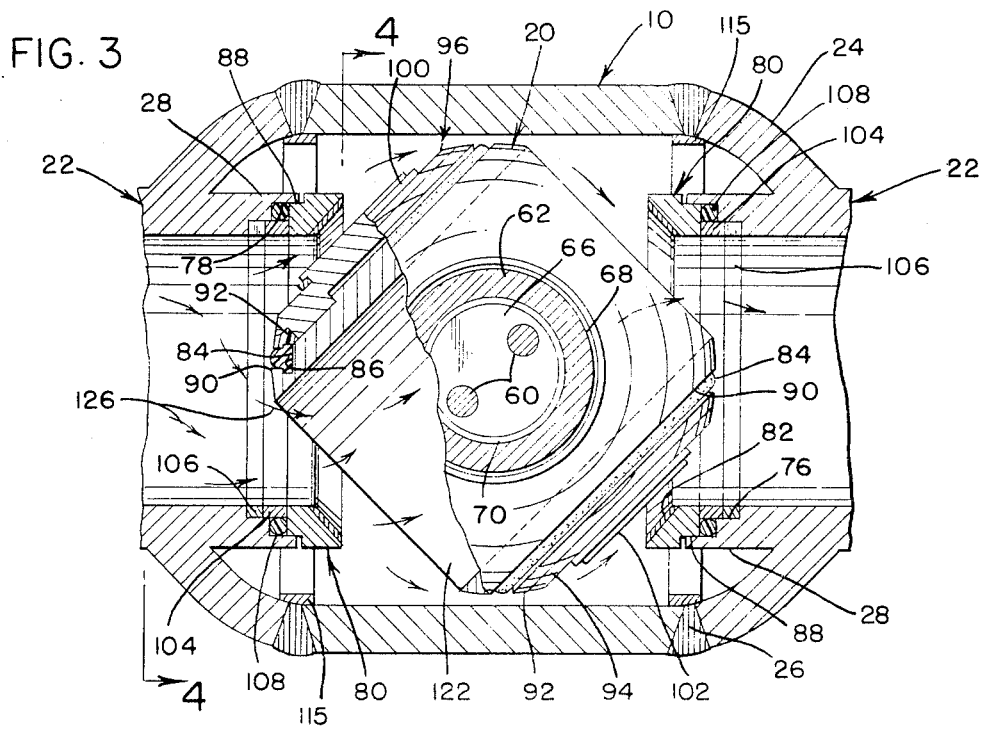
FIG. 3 is a fragmentary plan sectional view thereof, with parts broken away, showing the ball shut-off in throttling position.
Figure 4:
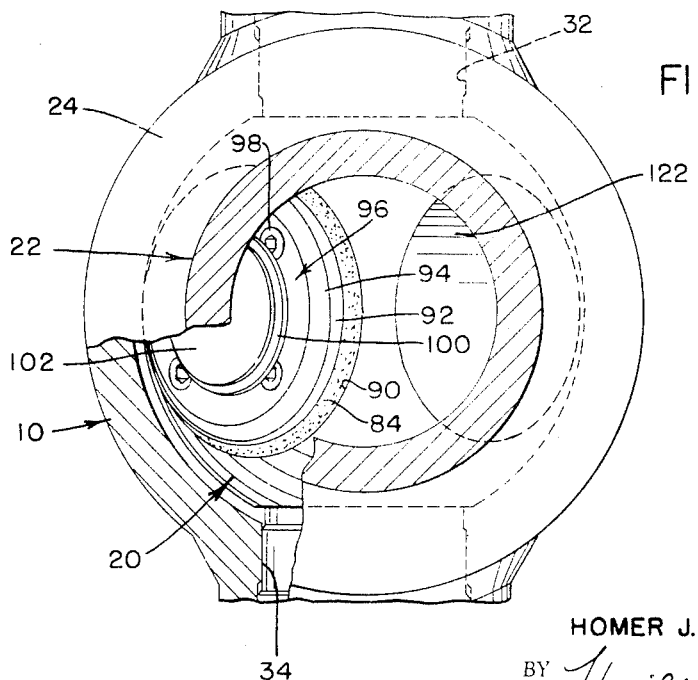
FIG. 4 is a transverse sectional view thereof on line 4—4 of FIG. 3, with parts broken away, showing the ball in elevation and in throttling position.

In viewing FIG. 3, it will be observed that when the ball shut-off has been rotated to a throttling position the flow path is as shown by the arrows 126. As a consequence of the manner in which the ribbed ring seal is located, the seal is out of the high velocity area and is thereby protected from the scouring of fluids passing through the pipe line in the throttling position of the ball. Moreover, because the ring seals are on the ball, the seal at the downstream side is out of the blast area, and the blast is taken by the Stellite coating on the seat at the downstream side. When the ball is rotated to the closed position, the ribbed ring seal seats against the Stellite coated seating surface and is anchored in place by the seal retainer rings and retainer plates, as shown in the embodiment of FIG. 1 or the retainer plates of the embodiment of FIG. 7.

In view of the fact that when the ball is in closed position the pressure is against the trunnions and not against the stem, the amount of torque necessary to rotate the ball shut-off is substantially reduced.

What is claimed is:
1. The method of fabricating a ball valve having a body constructed of a central tube and at least two flow tubes welded together, with a ball shut-off having a flow port and rotatable on a fixed axis in the central tube, comprising the steps of
temporarily mounting the ball shut-off in predetermined position within said central tube with the flow port of the ball coaxial with said central tube,
temporarily mounting said flow tubes coaxial with said flow port with the inner ends of said flow tubes in substantial abutment with said ball,
spacing said flow tube inner ends a predetermined distance from the ball by inserting shims of flexible material therebetween,
welding said flow tubes to said central tube while maintaining said flow tubes in position and then allowing the parts to cool,
journaling said ball in said central tube for rotation by a valve stem extending into said central tube in sealed relation therewith,
removing said shims through said flow tubes,
inserting ring seals and seal retainers through said flow tubes and positioning said seals between the ball and the inner ends of said flow tubes.

2. The method of fabricating a ball valve having a body constructed of a central tube and at least two flow tubes welded together with a ball shut-off having a flow port and rotatable on a fixed axis in the central tube, comprising the steps of
temporarily mounting the ball shut-off in predetermined position within said central tube with the flow port of the ball coaxial with said central tube,
temporarily mounting said flow tubes coaxial with said flow port with the inner ends of said flow tubes in substantial abutment with said ball,
spacing said flow tube inner ends a predetermined distance from the ball by inserting therebetween shims of flexible Teflon material of predetermined thickness,
welding said flow tubes to said central tube while maintaining said flow tubes in position and then allowing the parts to cool,
journaling said ball in said central tube for rotation by a valve stem extending into said central tube in sealed relation therewith,
freeing said shims by oscillating said ball and removing said shims through said flow tubes,
inserting ring seals and seal retainers through said flow tubes and positioning said seals between the ball and the inner ends of said flow tubes.

3. The method of fabricating a ball valve having a body constructed of a central tube and at least two flow tubes welded together with a ball shut-off having a flow port and rotatable on a fixed axis in the central tube, comprising the steps of
temporarily mounting the ball shut-off in predetermined position within said central tube with the flow port of the ball coaxial with said central tube,
temporarily mounting said flow tubes coaxial with said flow port with the inner ends of said flow tubes in substantial abutment with said ball,
spacing said flow tube inner ends a predetermined distance from the ball by inserting shims of flexible material therebetween,
Welding said flow tubes to said central tube while maintaining said flow tubes in position and then allowing the parts to cool,
journaling said ball in said central tube for rotation by a valve stem extending into said central tube in sealed relation therewith,
removing said shims through said flow tubes,
inserting resilient ring seals of larger diameter than said flow tubes through said tubes and positioning said seals between the ball and the inner ends of said flow tubes, inserting rigid retaining plates of slightly less diameter than said flow tubes through said tubes and securing said retaining rings to said ball.

4. The method of fabricating a ball valve having a body constructed of a central tube and at least two flow tubes welded together with a ball shut-off having a flow port and rotatable on a fixed axis in the central tube, comprising the steps of temporarily mounting the ball shut-off in predetermined position within said central tube with the flow port of the ball coaxial with said central tube, temporarily mounting said flow tubes coaxial with said flow port with the inner ends of said flow tubes in substantial abutment with said ball, spacing said flow tube inner ends a predetermined distance from the ball by inserting therebetween shims of flexible Teflon material of predetermined thickness, welding said flow tubes to said central tube while maintaining said flow tubes in position and then allowing the parts to cool, journaling said ball in said central tube for rotation by a valve stem extending into said central tube in sealed relation therewith, freeing said shims by oscillating said ball and removing said shims through said flow tubes, inserting resilient ring seals of larger diameter than said flow tubes through said tubes and positioning said seals between the ball and the inner ends of said flow tubes, inserting rigid retaining plates of slightly less diameter than said flow tubes through said tubes and securing said retaining plates to said ball.

5. The method of fabricating a ball valve having a welded body construction with a ball shut-off rotatable on a fixed axis therein and resilient seals between the ball and body, comprising the steps of temporarily mounting the ball shut-off without seals in predetermined position in the central body part, temporarily positioning and holding the body parts around the ball in assembled relation, inserting flexible shim material of predetermined thickness between the ball and adjacent seating surfaces on the body parts, welding said body parts together while maintaining them in position around the ball, allowing the assembly to cool, removing said shim material through the flow ports of said body, inserting resilient ring seals and seal retainers through the flow ports of said body and positioning said seals between the ball and the adjacent seating surfaces on the body.

6. The method of fabricating a ball valve having a welded body construction with a ball shut-off rotatable on a fixed axis therein and resilient seals between the ball and body, comprising the steps of temporarily mounting the ball shut-off without seals in predetermined position in the central body part, temporarily positioning and holding the body parts around the ball in assembled relation, inserting flexible Teflon shim material of predetermined thickness between the ball and adjacent seating surfaces on the body parts, welding said body parts together while maintaining them in position around the ball, allowing the assembly to cool, freeing said shim material by oscillating said ball and removing said material through the flow ports of said body, removing said shim material through the flow ports of said body, inserting resilient ring seals and seal retainers through the flow ports of said body and positioning said seals between the ball and the adjacent seating surfaces on the body.

7. The method of fabricating a ball valve having a welded body construction with a ball shut-off rotatable on a fixed axis therein and resilient seals between the ball and body, comprising the steps of temporarily mounting the ball shut-off without seals in predetermined position in the central body part, temporarily positioning and holding the body parts around the ball in assembled relation, inserting flexible shim material of predetermined thickness between the ball and adjacent seating surfaces on the body parts, welding said body parts together while maintaining them in position around the ball, allowing the assembly to cool, removing said shim material through the flow ports of said body, inserting resilient ring seals of larger diameter than the body flow ports through said ports and positioning said seals between the ball and the adjacent seating surfaces on the body, inserting rigid retaining plates of slightly less diameter than the body flow ports through said ports and securing said plate to said ball.

8. The method of fabricating a ball valve having a welded body construction with a ball shut-off rotatable on a fixed axis therein and resilient seals between the ball and body, comprising the steps of temporarily mounting the ball shut-off without seals in predetermined position in the central body part, temporarily positioning and holding the body parts around the ball in assembled relation, inserting flexible Teflon shim material of predetermined thickness between the ball and adjacent seating surfaces on the body parts, welding said body parts together while maintaining them in position around the ball, allowing the assembly to cool, freeing said shim material by oscillating said ball and removing said material through the flow ports of said body, removing said shim material through the flow ports of said body, inserting resilient ring seals of larger diameter than the body flow ports through said ports and positioning said seals between the ball and the adjacent seating surfaces on the body, inserting rigid retaining plates of slightly less diameter than the body flow ports through said ports and securing said plates to said ball.

9. In the method of fabricating a ball valve having a body constructed of a central tube and at least two flow tubes welded together with a ball shut-off having a flow port and rotatable on a fixed axis in the central tube, the steps of temporarily mounting the ball shut-off in predetermined position within said central tube with the flow port of the ball coaxial with said central tube, temporarily mounting said flow tubes coaxial with said flow port with the inner ends of said flow tubes in substantial abutment with said ball, spacing said flow tube inner ends a predetermined distance from the ball by inserting shims of flexible material therebetween, welding said flow tubes to said central tube while maintaining said flow tubes in position and then allowing the parts to cool, removing said shims through said flow tubes and replacing the shims with resilient ring seals.

10. In the method of fabricating a ball valve having a body constructed of a central tube and at least two flow tubes welded together with a ball shut-off having a flow port and rotatable on a fixed axis in the central tube, the steps of temporarily mounting the ball shut-off in predetermined position within said central tube with the flow port of the ball coaxial with said central tube, temporarily mounting said flow tubes coaxial with said flow port with the inner ends of said flow tubes in substantial abutment with said ball, spacing said flow tube inner ends a predetermined distance from the ball by inserting shims of flexible material therebetween, welding said flow tubes to said central tube while maintaining said flow tubes in position and then allowing the parts to cool, removing said shims through said flow tubes and replacing the shims with resilient ring seals of larger diameter than said flow tubes, inserting rigid retaining means of slightly less diameter than the flow tubes through said tubes and securing said retaining means to said ball.

11. In the method of frabricating a ball valve having a welded body construction with a ball shut-off rotatable on a fixed axis therein and resilient seals between the ball and body, the steps of temporarily holding the body parts in assembled relation around the ball without the resilient seals and with flexible shim material of predetermined thickness between the ball and adjacent seating surfaces on the body, welding said body parts together while maintaining the parts in position around the ball, allowing the assembly to cool, removing said shim material through the flow ports of the body and replacing the shim material with resilient ring seals.

References Cited by the Examiner
UNITED STATES PATENTS

| 2,415,412 | 2/1947 | Buchwald et al. | |
| 2,514,532 | 7/1950 | Allen et al. | 29—157.1 X |
| 3,079,675 | 3/1963 | Bradbury | 29—423 X |
| 3,155,368 | 11/1964 | Shafer | 215—315 X |

JOHN F. CAMPBELL, *Primary Examiner.*

J. D. HOBART, *Assistant Examiner.*